United States Patent [19]

Bodine

[11] 4,166,034

[45] Aug. 28, 1979

[54] METHOD AND APPARATUS FOR SONICALLY DEHYDRATING PRECIPITATE

[76] Inventor: Albert G. Bodine, 7877 Woodley Ave., Van Nuys, Calif. 91406

[21] Appl. No.: 904,038

[22] Filed: May 8, 1978

[51] Int. Cl.² ............................................. B01D 17/00
[52] U.S. Cl. ........................................ 210/67; 210/77; 210/384; 210/DIG. 22
[58] Field of Search ..................... 210/66, 67, 77, 388, 210/389, 384, 385, 354, 356, 406, 416, 402, DIG. 22, DIG. 18; 162/209, 210, 314, 308; 209/369

[56] References Cited

U.S. PATENT DOCUMENTS

| 2,218,206 | 10/1940 | Ackerly | 210/384 |
| 2,796,991 | 6/1958 | Nyquist | 210/384 |

Primary Examiner—Frank Sever
Attorney, Agent, or Firm—Edward A. Sokolski

[57] ABSTRACT

A drum (or disc) having a filtering membrane formed on the surface thereof is rotated continually into and out of a bath containing particulate material to be filtered and de-watered, such that a filter cake is formed on the outside of the membrane. A vacuum is provided at the center of the drum or disc structure to suck moisture from the filter cake during the portion of the cycle when this filter cake is out of the bath (the drum or disc being rotated at a very slow speed). A vibrator member having a surface in the form of a long narrow strip is placed against the drum or disc across a limited longitudinal slice thereof in a region of the filter cake, such that the sucking pressure has a substantial non-vibrating region to work on each side of the vibrated strip. The vibrational energy delivers vibration to the filter cake in such a manner as to upset the capillary equilibrium and thus facilitate the separation of the liquid from the filter cake. The vibratory member may be in the form of a resonantly vibrated elongated bar or tube which is biased against the outer wall of the drum or disc.

15 Claims, 9 Drawing Figures

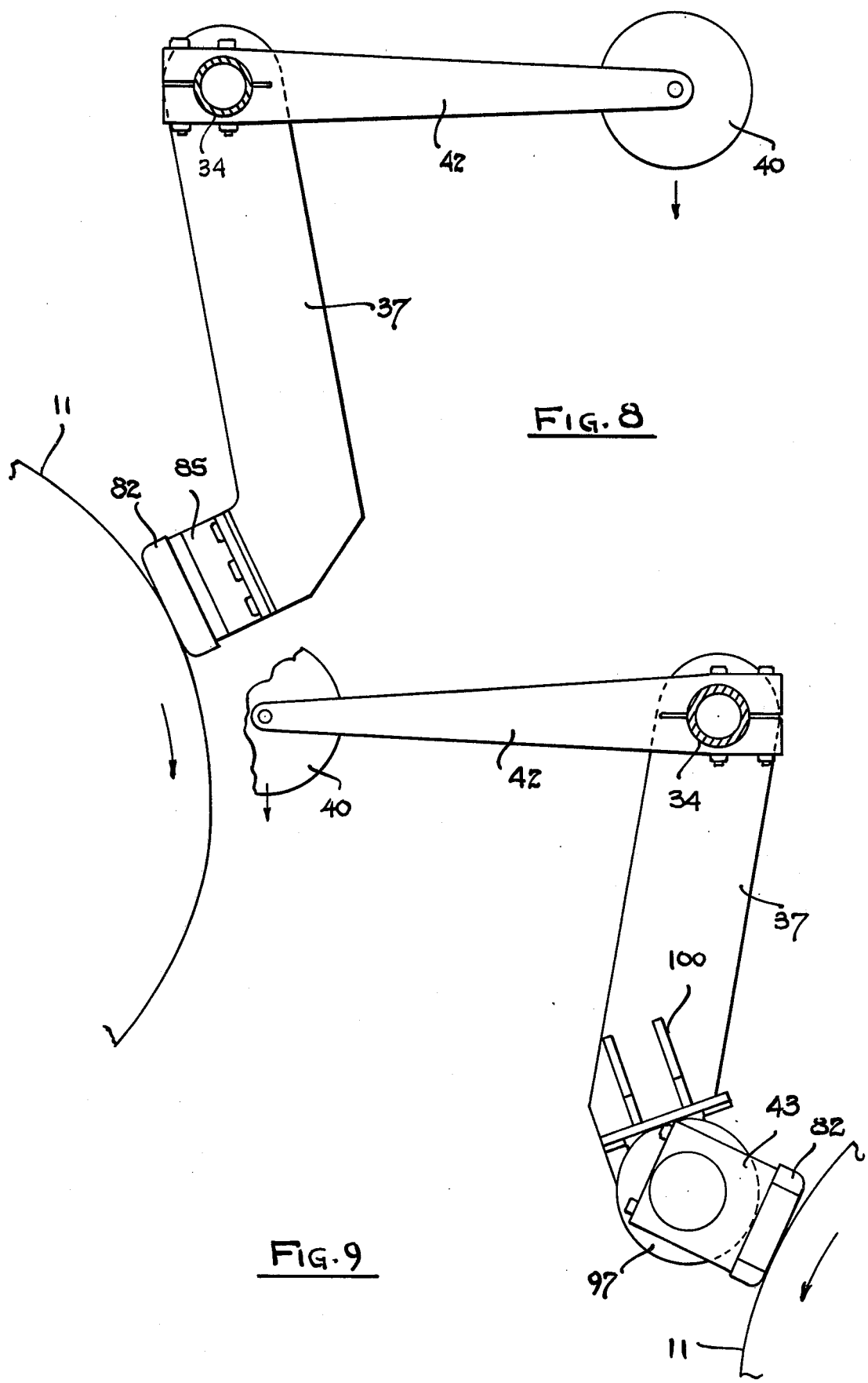

METHOD AND APPARATUS FOR SONICALLY DEHYDRATING PRECIPITATE

This invention relates to a method and apparatus for sonically dehydrating a precipitate, and more particularly to such a method and apparatus in which the sonic vibration is effected by means of an elongated vibrating member which is biased against a limited region of the wall of a continuous drum or disc filter.

In the de-watering of ore slurries and the like, a slowly and continuously rotating drum or disc filter having either a vacuum or sustained pressure on one side thereof is generally employed to cause a filter cake to form on one side of a filter membrane attached to the drum or disc. The filter may be formed by a fabric which is wrapped around the cylindrical outer surface of a drum, with a vacuum being maintained inside of the drum as the latter is rotated very slowly about its horizontal axis. The lower portion of the drum dips down into a liquid bath, such as a colloid from which particulate material is to be leached, with the vacuum or sustained pressure provided operating to suck the liquid through the filter membrane to form a filter cake layer on the cylindrical fabric surface as it rises up out of the colloidal bath. The filter cake is dried and is then peeled off by a knife edge which contacts the membrane surface before it again dips down into the colloidal bath. Moisture is thus drawn from the filter cake during the portion of the cycle when it is above the bath.

It has been found that the dehydration of precipitate can be greatly facilitated by sonic activation of this material, thereby causing the moisture particles trapped therein to migrate therefrom. Such a technique and apparatus for its implementation are described in my U.S. Pat. No. 3,520,251 issued July 14, 1970. In this patent, the precipitate to be dehydrated is fed between a pair of oppositely rotating drums or the like, the entire drums being resonantly vibrated by means of sonic oscillator units attached thereto. In the device of the aforementioned patent, the precipitate material is squeezed between the drums to remove some of the moisture and to provide a bias force which facilitates the coupling of sonic energy from the drum members to the precipitate material.

The technique and apparatus of the present invention differs from that of my aforementioned patent in that the vibratory energy is applied selectively to a long narrow strip portion of the drum, rather than being applied over the entire drum. In this manner, the vibrational energy is confined to a specific area of the filter cake wherein it operates to facilitate the separation of moisture therefrom, leaving the region of the drum to either side of this strip relatively free of vibrational energy such that the vacuum or pressure applied can more effectively perform its moisture removing functions. It has been found that by concentrating the sonic energy in a narrow region and combining it with the action of the vacuum or pressure source, much less vibrational energy is required to effect the desired results than in the device of my aforementioned prior patent. In addition, the extensive non-vibrated regions before and after the vibrating strip result in more optimized changes in capillary equilibrium for moisture mobility.

It is therefore an object of this invention to facilitate the removal of liquid from a filter cake in a drum de-watering device employing a vacuum or sustained pressure to form such a filter cake on a filter membrane.

It is another object of this invention to speed up the de-watering of ore slurries and the like in drum or disc type vacuum or pressure filters.

It is still another object of this invention to provide means for concentrating sonic energy in a predetermined optimum region in an operation for facilitating the de-watering of precipitate material to thereby lessen the total amount of such energy required for this operation.

Other objects of this invention will become apparent as the description proceeds in connection with the accompanying drawings, of which:

FIG. 8 is an end elevational view taken along the plane indicated by 8—8 in FIG. 1; and FIG. 9 is an end elevational view taken along the plane indicated by 9—9 in FIG. 7.

Figure 1:
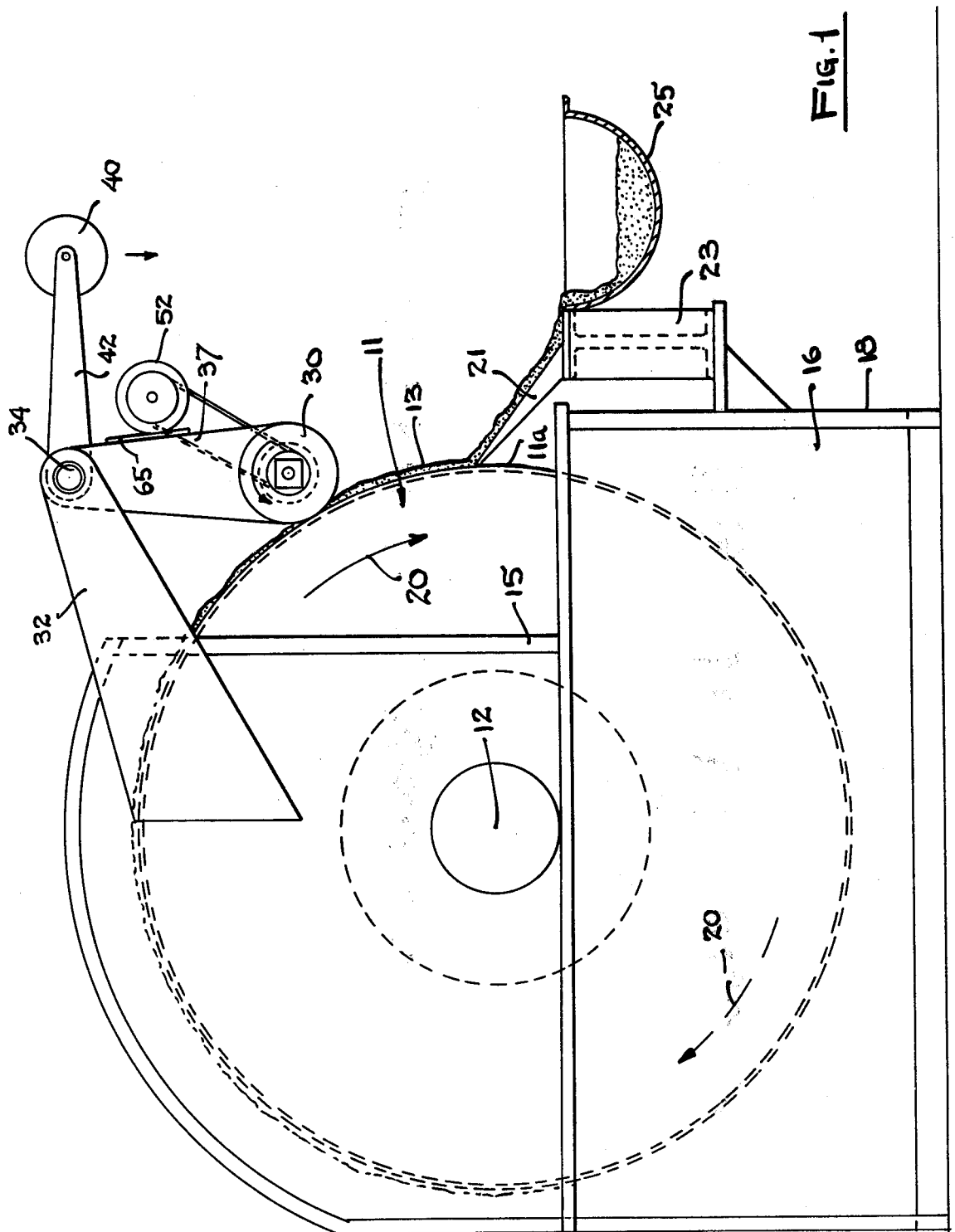
FIG. 1 is an end elevational view showing a first embodiment of the invention installed in a rotary drum filter.
Figure 2:
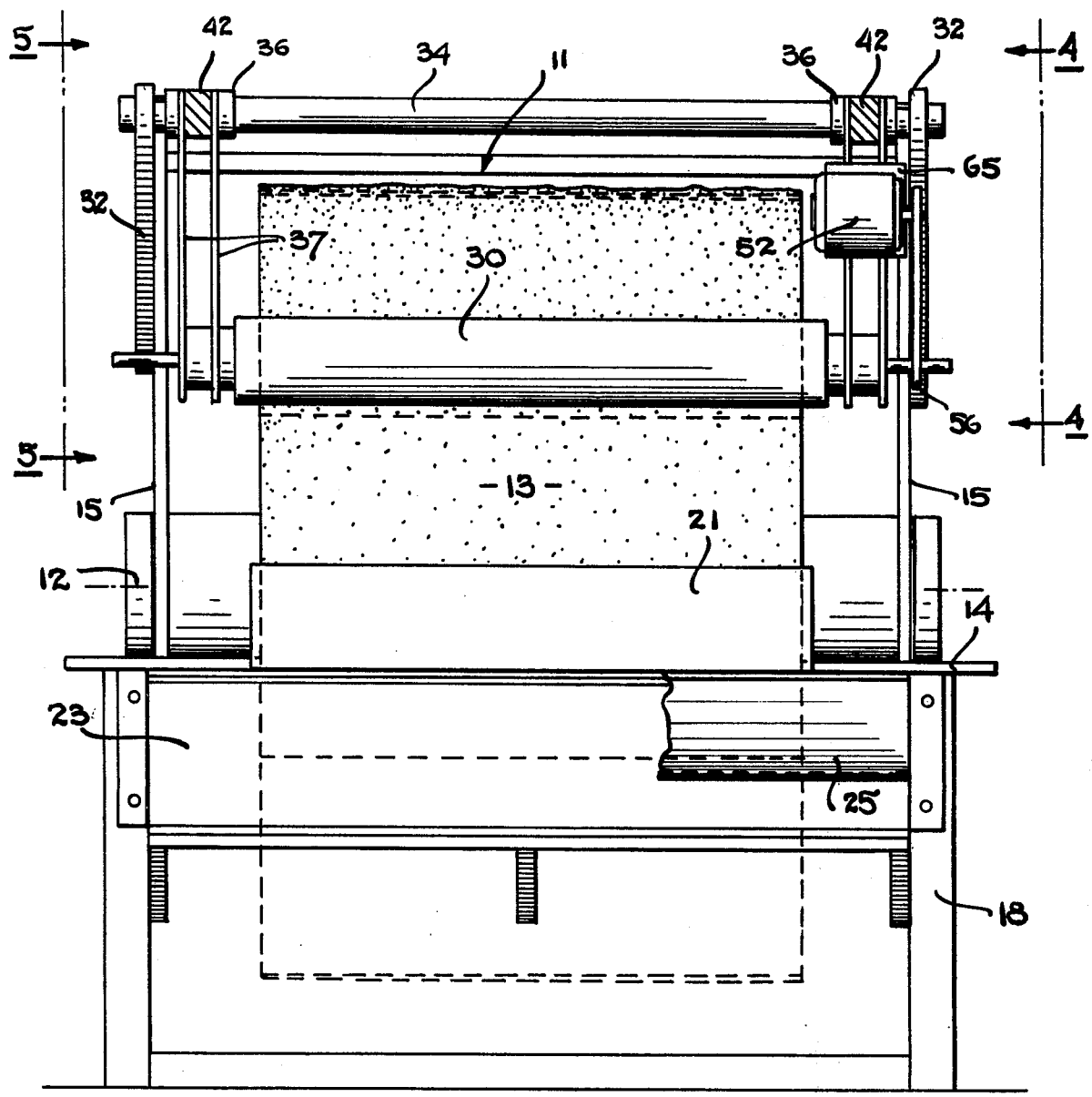
FIG. 2 is a side elevational view of the device of FIG. 1.
Figure 6:
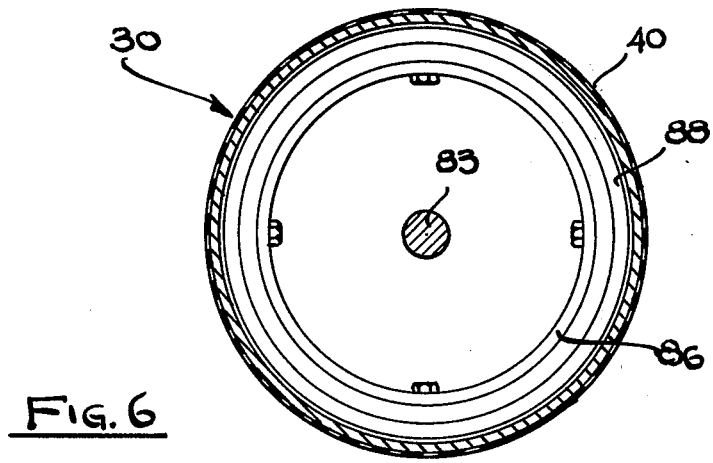
FIG. 6 is a cross-sectional view taken along the plane indicated by 6—6 in FIG. 3.

Briefly described, my invention is as follows:

A drum or a disc having a filtering membrane formed on the surface thereof, is rotated continually into and out of a bath containing particulate material to be filtered and de-watered. The filter membrane is generally in the form of a fabric and a vacuum is provided at the center of the drum or disc structure to suck moisture therefrom when the fabric is out of the bath, the drum or disc being rotated at a very slow speed. Precipitate material builds up on the outside of the membrane to form a filter cake thereon. A vibrating member having a surface forming a long narrow strip is biased against the drum or disc across a limited longitudinal slice thereof in a region of the filter cake outside of the bath, such that the sucking action of the vacuum has a substantial non-vibrating region which it can work on the cake on either side of the vibrated strip. The vibrational energy source delivers high level vibration to the filter cake in such a manner as to radically upset the capillary equilibrium, thereby facilitating the separation of liquid from the filter cake. In one embodiment the vibratory member is in the form of an elongated tube which is biased against the filter membrane, while in another embodiment the vibratory member is in the form of an elongated bar which is biased against this membrane.

Referring now to FIGS. 1-6, a first embodiment of the invention is illustrated. Drum 11 is supported for rotation about axis 12 on support structure 15, the drum being rotated at a relatively slow speed (of the order of 0.25 rpm) by a suitable drive mechanism (not shown). Drum 11 is positioned so that the lower portion thereof is submerged in a bath 16 containing particulate material to be filtered and de-watered, this bath being contained within container 18. The drum thus is slowly rotated in the direction indicated by arrows 20, the various portions of the drum continually entering and leaving the bath.

The outer cylindrical wall of drum 11 is formed by a suitable permeable fabric covering 11a, which forms a filter membrane. A vacuum is formed in the interior of hollow drum 11 by suitable means (not shown), causing particulate material from the bath to be sucked onto the membrane 11a and retained thereon so as to form a cake 13 of such particulate material on the outer wall of the membrane. A scraper knife 21 is supported on support member 23 which in turn is supported on the wall of container 18, this scraper knife engaging filter cake 13 as it passes thereby and scraping off this cake from the membrane. The cake material runs along the sides of scraper blade 21 into hopper 25 where it is collected.

Support arms 32 are fixedly attached to support frame 15 and have a cylindrical bar member 34 supported therebetween. Pivotally supported on bar member 34 by means of bushings 36 are first and second pairs of support brackets 37, from which an elongated cylindrical sonic vibrator member 30 is suspended. Cylindrical vibrator member 30 is biased against drum 11 by means of weights 40 supported on arms 42 which in turn are attached to the sonic vibrator support arm 37.

Figure 3:
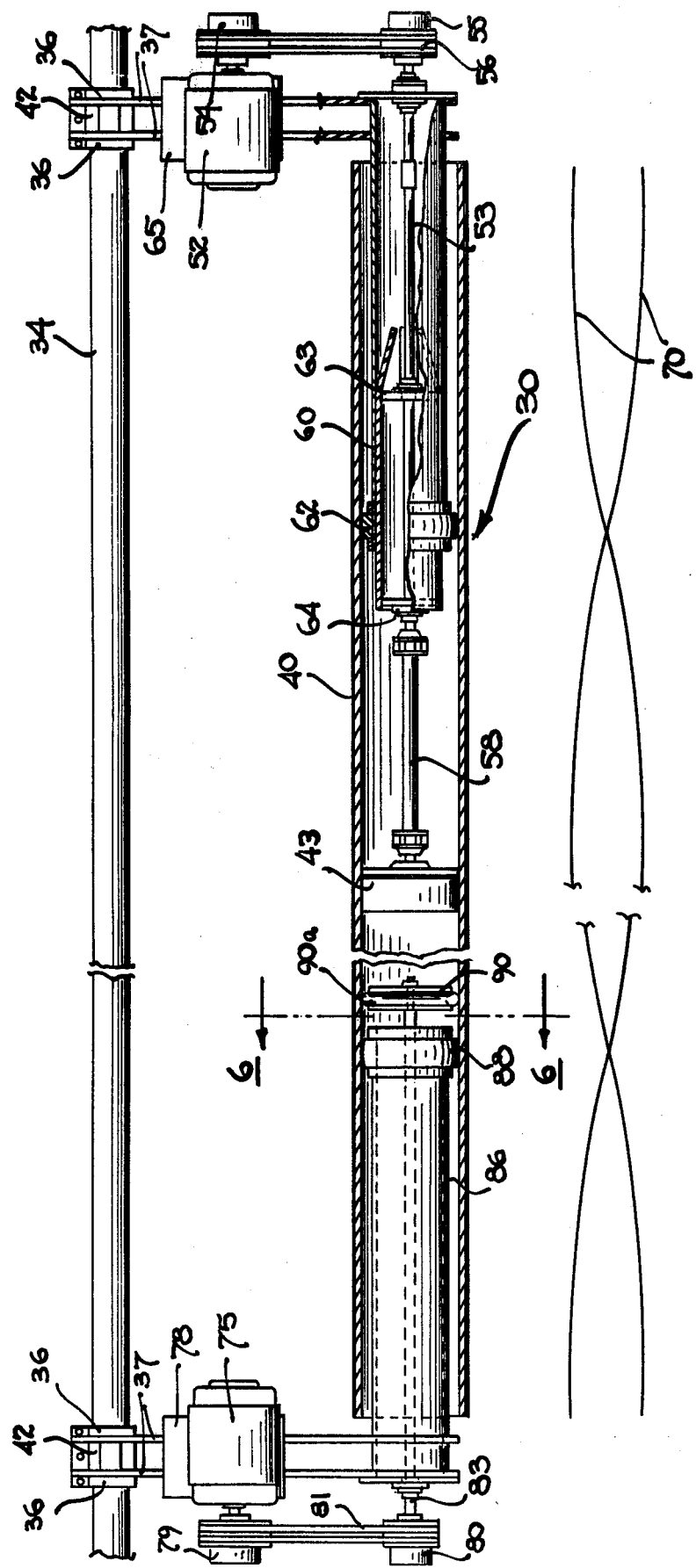
FIG. 3 is a side elevational view of the vibrational generator employed in the first embodiment.
Figure 5:
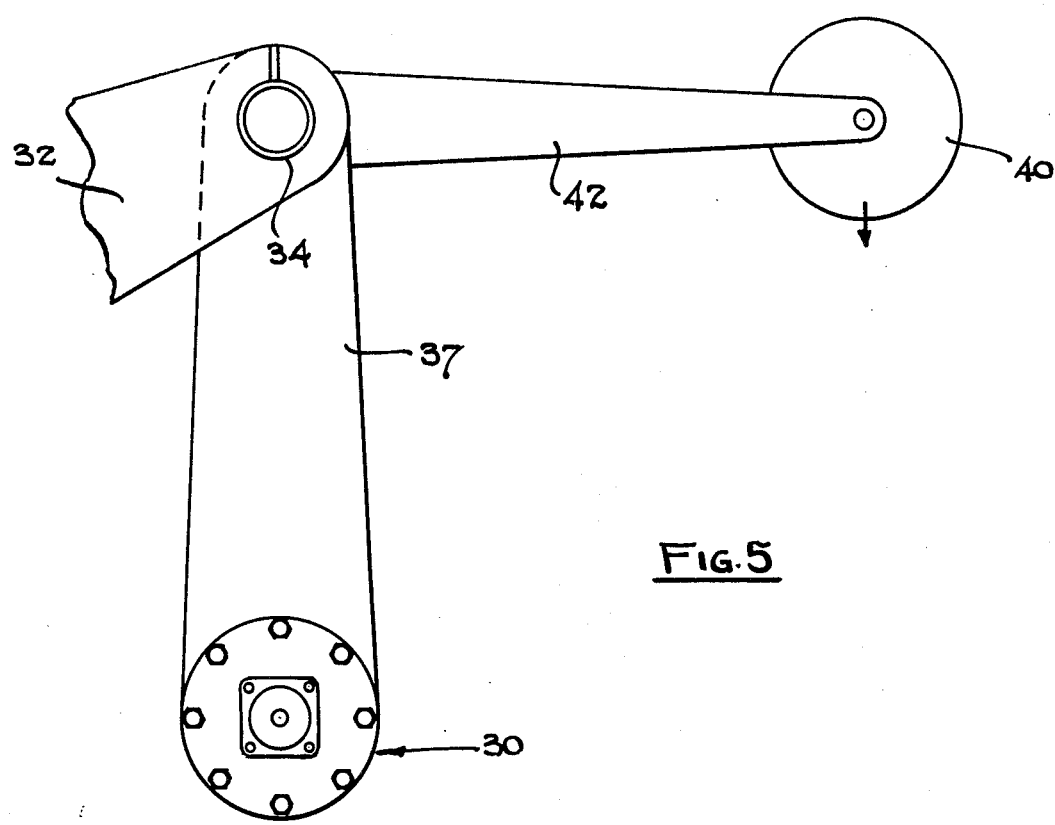
FIG. 5 is a view taken along the plane indicated by 5—5 in FIG. 2.
Figure 4:
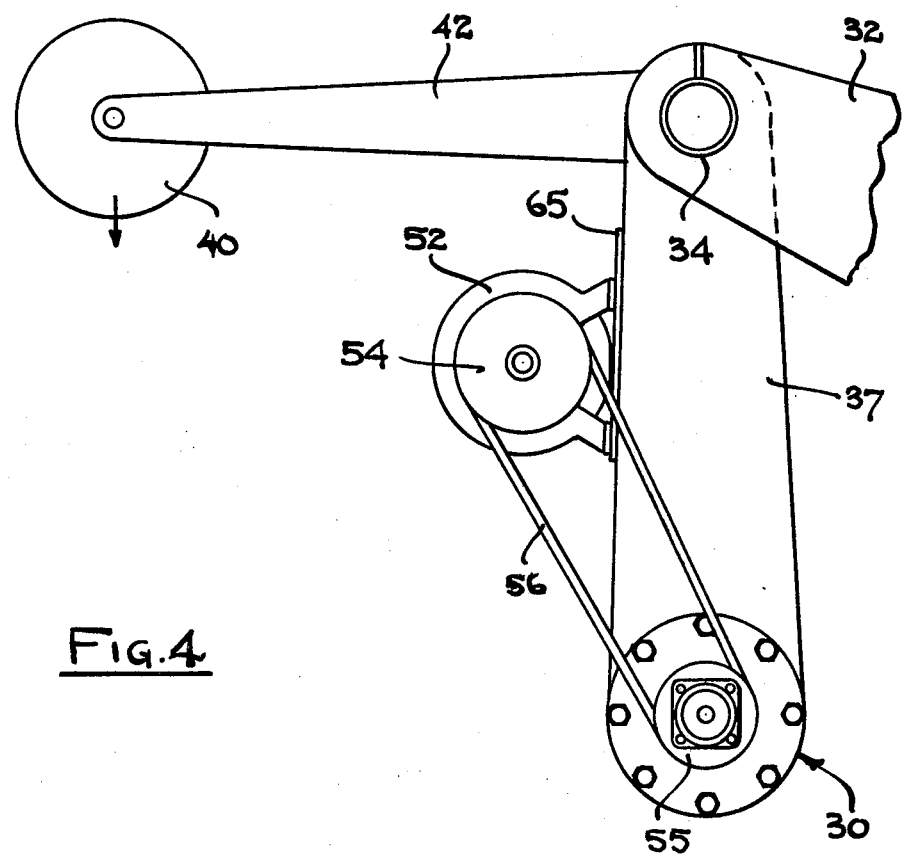
FIG. 4 is a view taken along the plane indicated by 4—4 in FIG. 2.

Referring now particularly to FIG. 3, the sonic vibration generator of the first embodiment is as follows: The vibration generator is formed from a tube member 40 of a highly elastic material such as steel. Fixedly supported within tube member 40 is an orbiting mass oscillator unit 43, the casing for this unit being tightly secured to the wall of tube member 40 by suitable means such as welding or bolting. Orbiting mass oscillator 43 may be of the swinging weight type having an eccentric rotor member supported for rotation about a central axis. Oscillators of this type such as described in my U.S. Pat. No. 3,417,966 or in Pat. No. 3,402,611, which is assigned to me, may be utilized. The rotor of orbiting mass oscillator 43 is rotatably driven at a speed which may be of the order of 5000 rpm by means of motor 52, which is coupled to shaft 53 by means of pulleys 54 and 55 and drive belt 56. Shaft 53 in turn is coupled to the rotor of the oscillators through universal joint coupling member 58. Shaft 53 is supported on bearings 63 and 64 within housing 60, which in turn is supported within tube member 40 by means of bushing 62. Motor 52 is supported on bracket 65 which in turn is attached to one of support arms 37. Orbiting mass oscillator 43 is preferably driven by motor 52 at a speed such as to set up standing wave vibration of tube member 40, which may be resonant, as indicated by wave pattern 70.

Tube member 40 may be rotated if so desired, as particular application requirements may demand, at a relatively slow speed, of the order of 0.25 rpm, by means of motor 75. Motor 75 is fixedly supported on bracket 78 which in turn is supported on a pair of the support arms 37. The drive shaft of motor 75 is coupled through pulleys 79 and 80 and drive belt 81 to shaft 83. Shaft 83 is rotatably supported on support member 86 which is supported within tube member 40 by means of bushing 88. Fixedly attached to the end of shaft 83 is a tube drive member 90 which has O-ring 90a around its periphery, this O-ring being pressed tightly against the inner wall of tube member 40 so as to grab the tube member. Thus, motor 75 can be rotated to slowly rotate the tube member about its axis, this being helpful in certain situations in facilitating the dehydration action.

Figure 7:
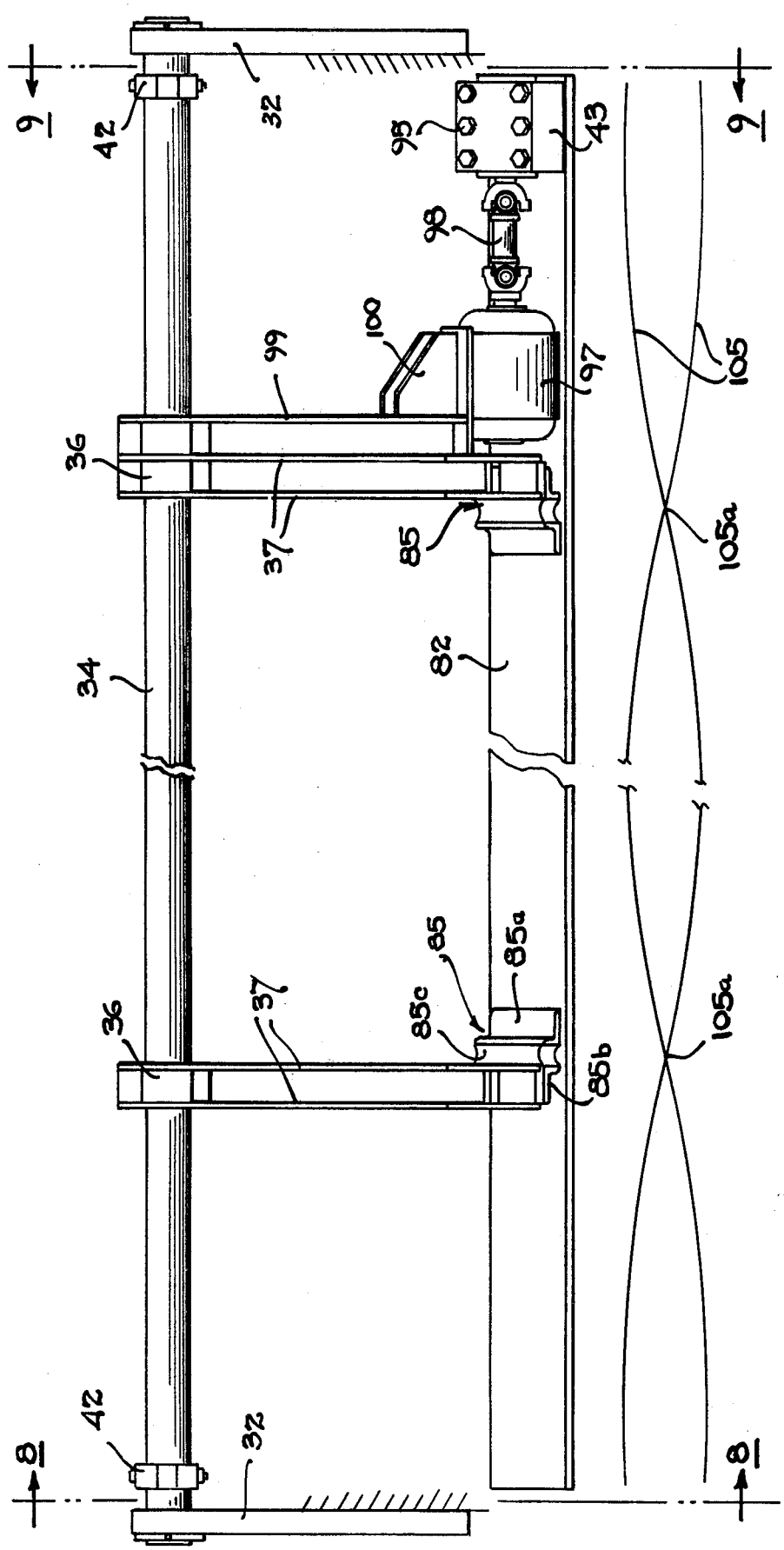
FIG. 7 is a side elevational view of a vibration generator which may be used in lieu of the vibration generator of FIG. 3.

Referring now to FIGS. 7–9, an alternate configuration for the sonic vibrator of the invention is illustrated. The second embodiment of the sonic vibrator is in the form of an elongated bar member 82 which is biased against the drum and operates in the same general manner as the cylindrical vibrator of the first embodiment. Bar member 82 is of an elastic material such as steel, and is pivotally suspended from support bar 34 by means of paired arm members 37 which are pivotally suspended from bar 34 by means of bushings 36, bar member 34 being fixedly supported on the support frame 15, in the same general manner as described for the previous embodiment. Arm members 37 are attached to bar 82 by means of vibration isolator brackets 85, these brackets being formed from angles 85a and 85b fixedly attached to bar 82 and arms 37 respectively by suitable means such as welding or bolting. Angles 85a and 85b are joined together by a rubber isolator 85c which is bonded to the angles.

Bar member 82 may be vibrationally driven in a resonant mode of operation so as to set up a standing wave pattern therein as indicated by wave forms 105 by means of orbiting mass oscillator 43 which may be of the same type as that used for the sonic vibrator of the first embodiment. Orbiting mass oscillator 43 is firmly secured to bar member 82 by means of bolts 95. The oscillator is rotatably driven by means of motor 97 which is coupled to the oscillator by means of universal drive shaft assembly 98. Motor 97 is supported on arm member 99 by means of bracket 100, arm member 99 being pivotally supported on bar 34. As for the previous embodiment, the bar member 82 is biased against drum 11 by means of weights 40 which are supported at the ends of arms 42 attached to the bar support arms 37.

One preferred form of my invention employs a motor 97 having a running speed which is not such as to cause resonance of bar 81, as illustrated by standing wave pattern 105. Resonance tends to create nodes 105a or quiescent regions where the vibratory action on the filter cake is too small. By running off-resonance there are no pronounced nodes in the standing wave and the treatment is more uniform. This is better for some colloids.

While the invention has been described and illustrated in detail, it is to be clearly understood that this is intended by way of illustration and example only and is not to be taken by way of limitation, the spirit and scope of this invention being limited only by the terms of the following claims:

I claim:

1. In a system for precipitating particulate material from a liquid bath including a porous membrane filter member, means for slowly moving successive portions of said filter member into and out of said bath, means for providing pressure at said filter member to cause precipitate from said bath to cake on the filter member, and means for removing the caked precipitate from said filter member, the improvement being means for sonically dehydrating said precipitate comprising:

a vibrator member in the form of an elongated substantially flat bar having a surface forming a long narrow strip, means for biasing said strip surface against a precipitate caked portion of said filter member which is outside of the bath, and means for causing said vibrator member to vibrate; said vibrator member being designed and positioned within said system so as to produce a resonant standing wave when caused to vibrate by said last mentioned means, in the absence of substantial loading on said filter member.

2. The system of claim 1 wherein the means for causing said vibrator to vibrate comprises an orbiting mass oscillator and means for rotatably driving said oscillator, the vibrational output of said oscillator being coupled to said vibrator member.

3. The system of claim 1 wherein said oscillator is an orbiting mass oscillator driven at a speed such as to set up resonant standing wave vibration of said vibrator member.

4. The system of claim 1 wherein said filter member is in the form of a drum having its cylindrical wall formed by a permeable membrane, said drum being partially submerged in the bath and rotatably driven through said bath.

5. The system of claim 4 wherein the means for removing the caked precipitate from the drum comprises a scraper which engages the caked precipitate at a position on the drum which is about to reenter the bath.

6. The system of claim 1 wherein the means for biasing the strip surface of said vibrator member against the caked portion comprises means for pivotally supporting said vibrator member from above the filter member, a lever arm attached to said pivotally supporting means and a weight attached to the end of said lever arm for rotatably urging the vibrator member.

7. The system of claim 1 wherein the means for biasing the strip surface of said vibrator member against the caked portion comprises means for pivotally supporting said vibrator member from above the filter member, a lever arm attached to said pivotally supporting means and a weight attached to the end of said lever arm for rotatably urging the vibrator member.

8. A method for precipitating particulate material from a liquid bath and dehydrating said precipitate comprising the steps of:
 passing successive portions of a porous membrane filter member into and out of said bath,
 applying inward pneumatic pressure against the outer surface of the membrane filter member so as to cause precipitate from the bath to cake on the filter member,
 biasing a strip portion of an elongated, substantially flat member against a strip portion of the caked precipitate, and
 vibrating the flat member at a sonic frequency such as to cause resonant standing wave vibration thereof thereby causing vibratory energy to be transferred to the strip portion of the precipitate thereby facilitating the migration of liquid therefrom.

9. The method of claim 8 wherein the filter member is in the form of a drum having its cylindrical wall formed by a permeable membrane which is rotatably driven so that successive portions thereof pass through said bath.

10. The method of claim 9 wherein pressure is applied by drawing a vacuum in the interior of said drum to draw precipitate onto the membrane.

11. In a system for precipitating particulate material from a liquid bath including a porous membrane filter member, means for slowing moving successive portions of said filter member into and out of said bath, means for providing pressure at said filter member to cause precipitate from said bath to cake on the filter member, and means for removing the caked precipitate from said filter member, the improvement being means for sonically dehydrating said precipitate comprising:
 a vibrator member in the form of an elongated tube having a surface forming a long narrow strip,
 means for biasing said strip surface against a precipitate caked portion of said filter member which is outside of the bath, and
 means for causing said vibrator member to resonantly vibrate; said vibrator member being designed and positioned within said system so as to produce a resonant standing wave when caused to vibrate by said last mentioned means.

12. The system of claim 11 wherein the means for causing said vibrator to vibrate comprises an orbiting mass oscillator and means for rotatably driving said oscillator, the vibrational output of said oscillator being coupled to said vibrator member.

13. The system of claim 11 wherein said filter member is in the form of a drum having its cylindrical wall formed by a permeable member, said drum being partially submerged in the bath and rotatably driven through said bath.

14. The system of claim 13 wherein the means for removing the caked precipitate from the drum comprises a scraper which engages the caked precipitate at a position on the drum which is about to reenter the bath.

15. The system of claim 11 and further including motor means for slowly rotating said tube about its longitudinal axis.

* * * * *